United States Patent
Lüchinger et al.

(10) Patent No.: US 8,104,521 B2
(45) Date of Patent: Jan. 31, 2012

(54) DOSAGE-DISPENSING DEVICE FOR POWDERS OR PASTES

(75) Inventors: Paul Lüchinger, Uster (CH); Sandra Ehrbar, Gutenswil (CH)

(73) Assignee: Mettler-Toledo AG, Greifensee (CH)

( * ) Notice: Subject to any disclaimer, the term of this patent is extended or adjusted under 35 U.S.C. 154(b) by 1169 days.

(21) Appl. No.: 11/902,044

(22) Filed: Sep. 18, 2007

(65) Prior Publication Data

US 2008/0072993 A1 Mar. 27, 2008

(30) Foreign Application Priority Data

Sep. 25, 2006 (EP) .................................. 06121165

(51) Int. Cl.
*B65B 3/04* (2006.01)
(52) U.S. Cl. .......... 141/83; 141/193; 141/344; 141/375; 222/77; 222/161; 222/181.1; 222/460; 222/561
(58) Field of Classification Search ................ 141/5, 67, 141/83, 94, 192–193, 231, 331, 336, 340, 141/344, 375; 222/160–162, 180, 181.1, 222/181.2, 183, 460, 462, 511, 559, 561; 117/68, 70
See application file for complete search history.

(56) References Cited

U.S. PATENT DOCUMENTS

| | | | | |
|---|---|---|---|---|
| 4,867,258 A | * | 9/1989 | Narukawa et al. | 177/70 |
| 4,974,646 A | * | 12/1990 | Martin et al. | 141/83 |
| 5,038,839 A | * | 8/1991 | Morimoto et al. | 141/83 |
| 5,145,009 A | | 9/1992 | Mheidle et al. | |
| 5,479,969 A | | 1/1996 | Hardie et al. | |
| 6,056,027 A | * | 5/2000 | Patterson | 141/83 |
| 6,354,339 B2 | * | 3/2002 | Luchinger | 141/83 |
| 6,701,977 B2 | * | 3/2004 | Taylor et al. | 141/83 |
| 7,134,459 B2 | * | 11/2006 | Carlson et al. | 141/67 |
| 7,284,574 B2 | * | 10/2007 | Fontaine et al. | 141/83 |
| 7,614,429 B2 | * | 11/2009 | Pluvinage et al. | 141/5 |
| 2006/0137760 A1 | | 6/2006 | Dubois et al. | |

FOREIGN PATENT DOCUMENTS

EP 0 406 164 A1 1/1991
EP 1 674 393 A1 6/2006

OTHER PUBLICATIONS

European Search Report.

* cited by examiner

*Primary Examiner* — Gregory Huson
*Assistant Examiner* — Nicolas A Arnett
(74) *Attorney, Agent, or Firm* — Buchanan Ingersoll & Rooney PC

(57) ABSTRACT

A dosage-dispensing device includes a drive device and a source container that can be set into the drive device, wherein a dosage-dispensing head is connected to a closure shaft which is movably constrained in the source container. The closure shaft has a coupler part configured to be coupled to and uncoupled from a drive shaft of the drive device. The source container has a first form element which is designed for form-fitting engagement with a first counterpart element formed on the drive device and serves to precisely position the coupler part in relation to the drive shaft. The source container further has a second form element which is designed for form-fitting engagement with a second counterpart element formed on the drive device and which, when in operating position, serves to precisely position the dosage-dispensing head in relation to a target container.

23 Claims, 3 Drawing Sheets

DOSAGE-DISPENSING DEVICE FOR POWDERS OR PASTES

RELATED APPLICATIONS

This application claims priority under 35 U.S.C. §119 to EP Application 06121165.2 filed in Europe on Sep. 25, 2006, the entire contents of which are hereby incorporated by reference in their entireties.

TECHNICAL FIELD

The present disclosure relates to a device for dispensing measured doses of substances in powder- or paste form.

BACKGROUND INFORMATION

Dosage-dispensing devices of this kind find application in particular in dispensing small quantities, for example of toxic substances, with high precision into small target containers. Frequently, such recipient containers are placed on a balance in order to weigh the substance delivered out of the dosage-dispensing device, so that the substance can subsequently be further processed according to given specifications.

The substance to be dispensed is contained for example in a source container which is equipped with a dispensing head. It is desirable to deliver the substance to the outside through a small outlet opening in the dosage-dispensing device, so that the substance can be filled in a targeted stream into a container with an opening of narrow cross-section.

Dosage-dispensing devices for dry and/or powdery substances of a pourable consistency, for example color pigments belong to the known state of the art and are in current use. For example in U.S. Pat. No. 5,145,009 A, a dosage-dispensing device is described which consists of a source container with a closable outlet at its underside. As a closure element, the device has a cone-shaped valve body which is narrower towards the top, is vertically movable in the downward direction to open an outlet orifice, is rotatable when in the open position, and is equipped with means for advancing the substance towards the outlet opening. Furthermore, a drive shaft passes through the source container, extending beyond the topside of the latter, where it is coupled to a drive mechanism. The source container has at its underside a connecting flange that attaches to the dosage-dispensing device. Several pressure cylinders act on the cover of the source container, whose stroke travel allows the outlet opening and thus the rate of delivery from the source container to be controlled. The valve body in dosage-dispensing devices of this kind needs to be seated in the source container with as little free play as possible in order to allow an accurate control of the substance doses being dispensed. Furthermore, dispensing of doses in the microgram range requires very rigid connections between the drive mechanism and the source container seated in place, because in the final phase of the dosage-dispensing process the remaining substance quantity is released by minute changes in the angle of rotation and the vertical stroke position of the valve body.

In view of the requirements that are placed on the attachment of the source container in the dosage-dispensing device, the arrangement of the foregoing description has the disadvantage that the source container and the mechanical interface connections of the dosage-dispensing device to the source container have to be matched to each other very precisely in order to allow the drive shaft to be coupled to the drive mechanism when the source container is set into the dosage-dispensing device. The tight tolerances on fit and position associated with this requirement make the parts very expensive to produce. Furthermore, depending on the design of the connecting flange, setting the source container into place is a time-consuming operation due to the required alignment operations. This dosage-dispensing device is therefore strongly dependent on the infrastructure at the location where it is installed.

SUMMARY

In view of the limitations in using the dosage-dispensing device of the foregoing description, the present disclosure therefore has an objective to provide a dosage-dispensing device which allows the source container to be exchanged in a quick and simple manner.

A dosage-dispensing device for substances in powder- or paste form which meets this objective comprises a drive device and a source container that can be set into the drive device, wherein a dosage-dispensing head with a closure body that can be set into rotation by a drive mechanism and is connected to a closure shaft which is movably constrained in the source container is arranged at the underside of the source container when the latter is in its operating position. The closure shaft has a coupler part in the area where it passes through the top of the source container. The coupler part is configured to be coupled to and uncoupled from a drive shaft of the drive device. The source container further has a first form element which has a form-fitting engagement with a first counterpart element formed on the drive device and which serves to precisely position the coupler part in relation to the drive shaft in a plane that is orthogonal to the axis of rotation of the drive shaft. The source container further has a second form element which has a form-fitting engagement with a second counterpart element formed on the drive device and which, when in operating position, serves to precisely position the dosage-dispensing head in relation to a target container which is arranged below the dosage-dispensing head.

With the use of two connecting areas, the mutual positioning at two interfaces is accomplished. The first interface between the source container and the drive device concerns the coupling engagement between the drive shaft and the closure shaft, while the second interface concerns the positioning of the dosage-delivery outlet opening in relation to the fill opening of a target container.

This arrangement offers several advantages over the known state of the art. Since the first form element defines the position only within a plane and the second form element defines the remaining spatial coordinates, a statically determinate mechanical connection is established between the source container and the drive device. Thus, no tight dimensional tolerances are needed for the distance between the first and the second form element. Furthermore, temperature-related changes in the height of the source container do not cause internal stresses in the system. Small dimensional differences between different source containers can be compensated by a height-adjustable drive connection or by a length adjustment in the coupler part.

Likewise, a rectangular configuration of the individual parts of the source container and of the drive device is no longer important. The source container can have any desired shape. By arranging the first form-fitting part in close proximity to the coupler part, as well as arranging the first counterpart element close to the drive shaft, this interface between the drive device and the source container can be defined without a large effort or expense. The same applies to the second form element, which is arranged in close proximity to the dosage-dispensing head, and to the fill opening of the target container, which can be exactly positioned relative to the second counterpart element. As positioning aids for the target container, it is conceivable to use for example markings on the load receiver of a balance or a load receiver of a configuration that is matched to the target container.

To make it possible that source containers of different lengths can be used in the same drive device, the distance of the first counterpart element to the second counterpart element can be adjustable, so that it can be matched to the distance between the first form element and the second form element of a source container. Using source containers of different lengths has various advantages. For example, source containers with the same cross-sectional dimensions can be produced with different volumes. Using identical cross-sections means that the source containers differ from each other only in their lengths and that therefore the peripheral instruments and interfaces to the drive device do not have to be changed. It is not impossible to store small substance quantities in large containers, but in addition to the larger space required in the logistics for large containers, large dead volumes inside the source container are undesirable. The medium that occupies the dead space, for example air, can cause a faster aging of the substance that is stored in the container. As the source containers are also intended for use with very expensive substances, it is of advantage to have a selection of containers with different volume capacities available. Thus, if the quantities to be dispensed are small, there is a smaller dead volume and a smaller internal surface in the container, to which part of the substance could stick, whereby the actual substance quantity available for dispensing would be reduced.

To prevent spillage of any of the substance during the dosage-dispensing process, it is of advantage if the distance between the second counterpart element and a fill opening of the target container or—when the source container is seated in the drive device—the distance between the dosage-dispensing head and a fill opening of the target container is adjustable. Thus, target containers of different container heights can be placed under the dosage-dispensing head.

As an example, the rotary axis of the closure shaft, the rotary axis of the drive shaft and, if applicable, the center of the fill opening area of the target container are in line with each other when the source container is installed in the drive device and ready to use.

Under a further exemplary aspect of the disclosure, the drive device is electrically and/or mechanically connected to a force-measuring device, in particular a balance. The latter can during the dosage-dispensing collect appropriate control- and regulating data for the control and regulation of the dosage-dispensing process. The control- and regulating quantities, in particular the change of the weight values as a function of time, can be processed in a control- and regulating unit, whose output values can control the drive device in a suitable manner. The balance can be positioned so that the center of the area of the load receiver, specifically of the weighing pan, is located below the dosage-dispensing head in order to avoid possible errors due to an eccentric placement of the load. The target container rests on the load receiver during the dosage-dispensing process, which allows a continuous collection of weight data and thus the control and regulation of the dosage-dispensing process.

As explained above, making source containers available in different sizes offers advantages, but it can on the other hand involve considerable additional costs in production and in the logistics. In a further exemplary configuration of the disclosure, the source container therefore has a tubular middle part whose bottom end connects to the dosage-dispensing head and whose upper end is connected releasably and/or integrally to a cover. As an example, the passage area as well as the first form element are formed on the cover, while the second form element is formed on the dosage-dispensing head. With different lengths of the middle part, the volume of the source container can be adapted in a simple manner to the needs of the user.

The tube-shaped middle part can have an arbitrary cross-sectional profile orthogonal to the rotary axis. The tube-shaped middle part further does not necessarily have to be rod-shaped, its cross-sectional profile can also vary over its length. In source containers where the cross-section remains constant over the length, the volume of the source container can be determined by the length of the tube-shaped middle part.

As the first form element needs to position the source container in relation to the drive device only in a plane perpendicular to the rotary axis of the drive shaft, the first form element can be of a cylindrical or barrel-shaped configuration. However, it can also have an arbitrary shape, provided that on the form element at least the contact locations that engage the first counterpart element are arranged on a circle in the plane which extends orthogonal to the rotary axis, with the center of this circle lying on the rotary axis of the closure shaft. The form element is ideally configured with a tubular shape and embraces at the same time the passage area of the closure shaft and/or the coupler part to which the closure shaft is connected.

So that the source container can be set into the drive device horizontally in relation to the direction of the load, the first counterpart element can have a forked part whose slot matches the first form element in width, with the bottom of the slot being designed as a position-defining rest stop for the first form element.

However, when the source container is set in place, it could fall out of the drive device that is configured in this way, as the first form element could be shaken loose from the first counterpart element as a result of vibrations. For this reason, there can be a retaining latch arranged on the first counterpart element, which interacts at least with the first form element or with the source container and serves to secure the source container, after it has been set in place, against accidentally falling off.

To hold the source container in a stable position relative to all spatial directions, the inventive concept includes a second form element as described above, which cooperates with the second counterpart element in a form-fitting engagement when the source container is seated in place. A stable positioning with regard to all spatial directions can be achieved with a configuration of the second form element that contains at least one zone of a spherical surface whose center lies on the rotary axis of the closure shaft. The second counterpart element has at least one breakthrough or cutout with a narrowing taper in the direction of the load. At least three contact points are formed in this cutout, which are arranged in a plane that is orthogonal to the drive shaft and at equal distances from the drive shaft and which are in contact with the aforementioned spherical zone when the source container is seated in place, whereby the source container is defined in its spatial position relative to the drive device and to the target container. In the case of three contact points, the angles enclosed between any two radii from the center of the sphere to the contact points can be smaller than 180°, since otherwise a stable seating position would no longer be assured. The problems explained above in regard to the fit and position tolerances of the source container, in particular the requirement of a right angle between the longitudinal axis and the seat of the container, are defused with this spherical seating contact.

A fork-shaped counterpart element is particularly easy to produce, where at least the bottom of the slot between the fork tines has a conical flank that narrows in the direction of the load. When the source container is set in place, it is being positioned and supported along a contact line between the spherical zone and the cone flank, regardless of any angular deviations that may exist between the drive device and the source container or the straightness of the source container.

Ideally, the source container or at least the first form element is configured with rotational symmetry relative to the rotary axis of the closure shaft. Thus, in the process of being set into the drive device the source container is position-independent relative to its rotary axis. After it has been set into the drive device, the source container can be freely rotated about its rotary axis. This has the advantage that with form-fitting couplings, the source container can for example be turned manually into the right position relative to the rotary axis of the closure shaft, until the coupling parts can be joined together.

If the source container can be turned freely in the drive device about the rotary axis in the drive device, there should in addition be a securing element against rotary displacement, which serves to take up torques which are introduced from the drive device or from the outside to the source container.

A simple projection engaging a groove can serve the purpose of a securing element against rotary displacement. If this projection is connected to the drive device through a spring element, it is possible for example that a source container of a rotationally symmetric design is first set into the drive device and then turned about the rotary axis of the closure shaft until the projection snaps into the groove that is formed on the source container. Of course, the groove could also be formed on the drive device and the projection on the source container.

Furthermore, if it is equipped with a spring element, the securing device against rotary displacement could also serve to protect the drive mechanism from overload. By setting the spring force, more specifically the pretensioning force, it is possible to set the maximum transmissible torque.

As the dosage-dispensing device according to the disclosure is designed for a quick exchange of the source containers, the latter can carry an I.D. mark or an I.D. emitter, for example a barcode, matrix code, or an RFID tag. The I.D. reader device can be arranged in a suitable location of the drive device.

To ensure that the identification of the source container or, if applicable, the storing of data in the I.D. emitter or the printing of specific data on the source container is trouble-free, the identification marking or the identification emitter should be aligned in relation to the identification reader device. The position alignment can occur by means of the securing device against rotary displacement, if the latter has at least one detent position. With this position alignment, the position of the reader area is precisely defined. The stored or printed data could for example include the length of the respective source container. This information could be called up by the drive device and serve to automatically adjust the distance between the first counterpart element and the second counterpart element.

As a practical point, the form elements and counterpart elements of the foregoing description are designed so that a slight lifting is enough to remove the source container from its seating position in the drive device. To prevent that the source container jumps out of the drive device during the dosage-dispensing process, the drive device can be equipped with a latching device which at least during the operating phases serves to secure the source container that is seated in place against axial displacement in relation to the rotary axis of the closure shaft.

In a further exemplary embodiment of the disclosure, the dosage-dispensing device can be supplemented with a handling device for source containers. To provide the possibility of running automated processes, at least the source containers need to have a suitable means where the movable elements of the handling device, for example a robotic arm, can get a grip. As an example of such a means, the source container can have at least one flange extending at least partway around the source container in a plane that is oriented orthogonal to the axis of rotation, with at least one first projection that is formed on the rim of the flange and points in the direction of the load.

As an example, the at least one flange and the at least one first projection are configured to be concentric relative to the closure shaft. Due to the rotationally symmetric configuration, the source container is position-independent relative to the rotary axis of the closure shaft, which significantly simplifies the running of automated processes.

The handling device further includes at least one pick-up element which is configured to provide a form-fitting engagement with the flange and the at least one first projection. The pick-up element is configured with at least one fork-shaped seat and at least one recess and/or a second projection. The at least one fork-shaped seat serves at least partially as a seat for the flange, when the source container is seated in the pick-up device. To prevent the source container from falling out of the fork-shaped seat during handling, the at least one recess partially or completely encloses the at least one projection, or the second projection engages the first projection. With a linear movement in the direction of the rotary axis of the closure shaft, the source container is set into or lifted out of the seat. A seat designed according to this concept provides a simple way of automating the operations of setting the source container into, and removing it from, the drive device.

The mixing of a plurality of substances normally requires the use of several source containers. As long as they are not seated in the drive device, they can be stored near the dosage-dispensing device in a multi-unit rack. The latter can be integrally incorporated in the handling device, or it can be separate from the handling device.

The handling device can be connected to the drive device, and at least one memory unit can be arranged in the handling device and/or in the drive device. The memory unit can serve to store the respective positions of the source containers stored in the multi-unit rack and their specific data such as for example the lengths of the source containers.

BRIEF DESCRIPTION OF THE DRAWINGS

Details of the dosage-dispensing device according to the disclosure will be apparent from the description of the examples of embodiments that are shown in the drawings, wherein.

DETAILED DESCRIPTION

Figure 1:
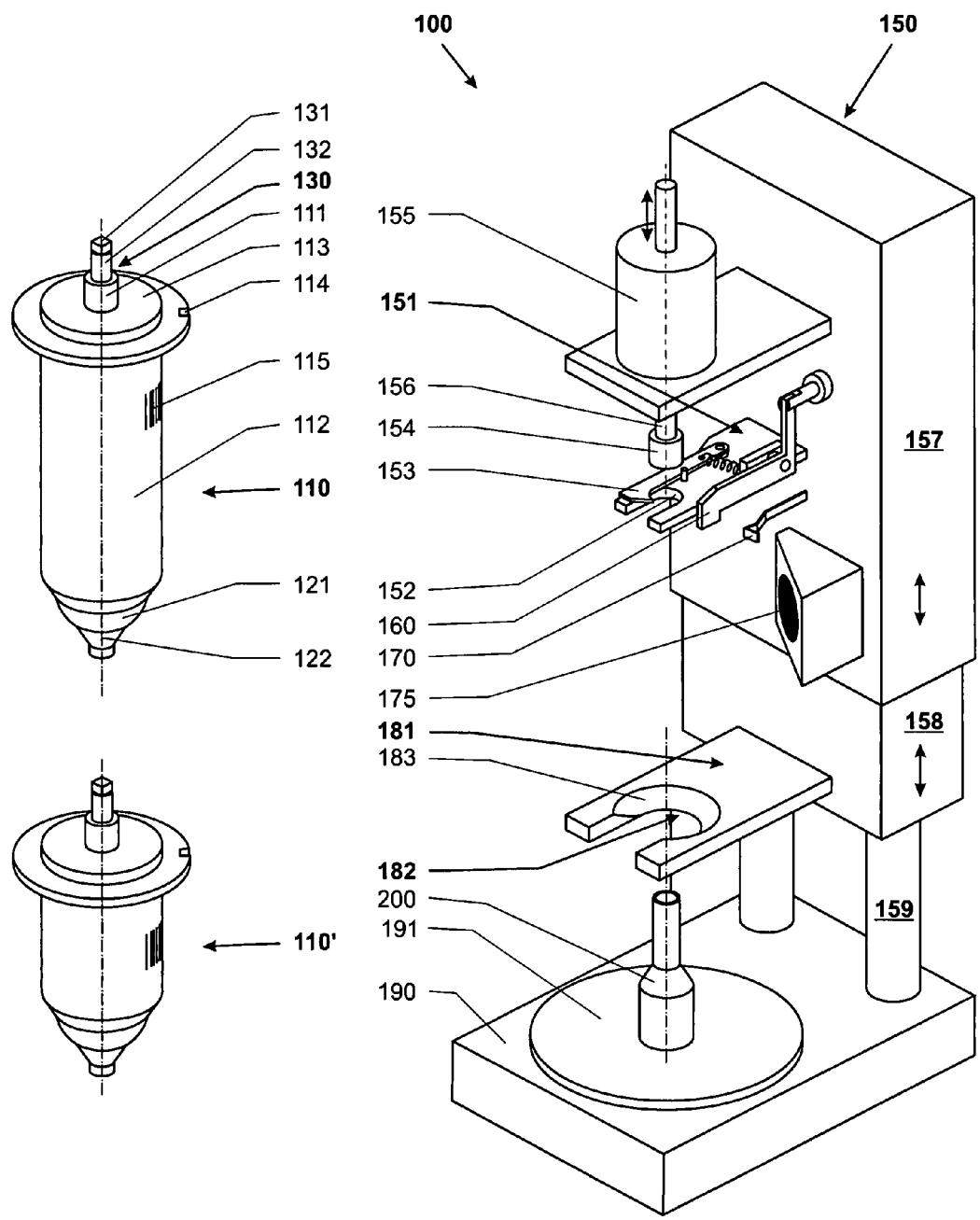
FIG. 1 represents an exemplary dosage-dispensing device according to the disclosure with a drive device and two source containers of different length, wherein the source containers are shown separate from the drive device.

FIG. 1 shows a dosage-dispensing device 100 with a drive device 150 and a source container 110 that can be set into and removed from the drive device. The drive device 150 includes a top part 157 and a bottom part 158 which are capable of linear movement substantially in the direction of the load towards each other and away from each other. This makes it possible to use source containers 110, 110' of different length. To ensure a simple exchange of the source container 110 and a safe and accurate dosage-dispensing operation, the source container 110 and the drive device 150 need to be equipped with suitable mechanical, possibly mechanical and electrical, connector elements of matching configuration for a form-fitting mutual engagement. The source container 110 includes at least one form element 111 which is held in a defined position in a plane that extends orthogonal to the load direction by a first counterpart element 151 which is formed on or connected to the top part 157. The source container 110 further has at least a second form element 121 whose spatial position relative to the drive device 150 is defined by a second counterpart element 181 which is formed on or connected to the bottom part 158. The source container 110, specifically its delivery orifice, it thereby brought into exact alignment with the target container 200.

The basic profile of the source container 110 in FIG. 1 is cylindrical. However the source container can in principle also have a different shape, such as for example a quadratic, hexagonal or octagonal external or internal cross-section. The source container 110 set in place in the drive device 150 is in its operating position oriented with its longitudinal axis aligned in the direction of the load. A dosage-dispensing head 122 is arranged at the lower end of the source container 110. Incorporated in the dosage-dispensing head is a closure body (not shown in the drawing) which can driven to rotate and which is connected to a closure shaft 132 that is movably constrained in the source container 11. The body of the source container 110 is configured as a tube-shaped middle part 112 and is closed off at the top by a cover 113. The cover 113 and the tube-shaped middle part 112 can also be monolithically connected to each other. The cover 113 has a passage area 130 where the end of the closure shaft 132 that faces away from the closure body is rotatably constrained and protrudes outside of the source container 110. This end of the closure shaft 132 includes a coupler part 131 which in this embodiment is configured with a quadratic profile and which is, at least during the dosage-dispensing process, connected through a coupler sleeve 154 to the drive mechanism 155 that is incorporated in the drive device 150. To engage the coupling connection, the drive mechanism 155 or at least a drive shaft 156 connected to the drive mechanism can be capable of linear displacement in the direction of the load. Of course, instead of a quadratic-profiled coupler part, any couplers based on form-fitting or force-coupled engagement could be used whose coupler halves can be separated from each other in a simple way. However, in selecting the coupling it is an important consideration that there must not be any slippage between the coupler halves during normal dosage-dispensing operation, because depending on the dosage-dispensing method, this could compromise the precision of the dosage-dispensing device 100.

Figure 2:
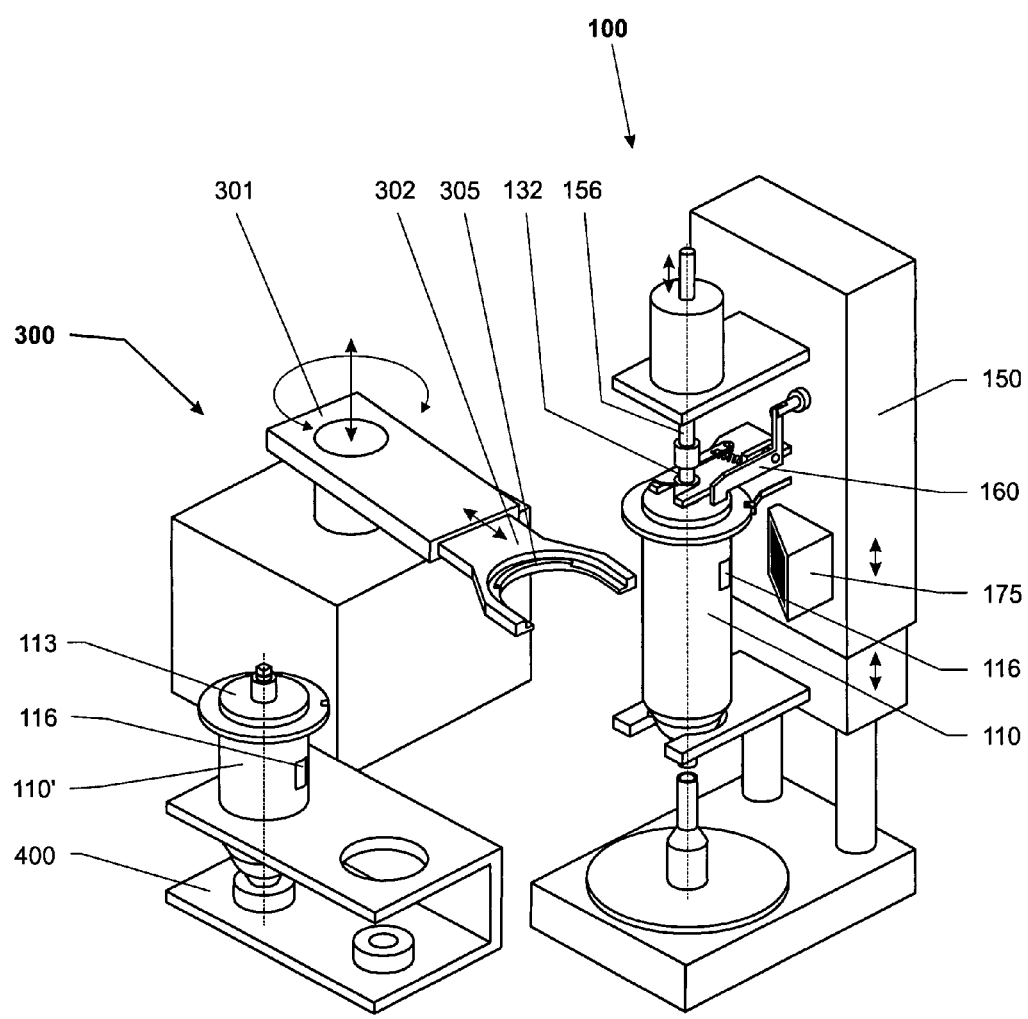
FIG. 2 shows the dosage-dispensing device of FIG. 1, with a source container set into the drive device, as well as a handling device and a multi-unit rack in which a second source container is stored in an upright position.

There is also a simple way of realizing a mechanical connection between the source container 110 and the drive device 150 with a design where the first form element 111 is of a cylindrical or spherical shape or barrel-shaped and engages a first counterpart element 151 of fork-shaped configuration. So as not to compromise the accuracy of the dosage-dispensing device 100, the form-fitting connection in the plane orthogonal to the direction of the load should as much as possible be free of play. The slot width of the fork-shaped first counterpart element 151 can match the diameter of the first form element 111. Furthermore, the bottom 152 of the slot serves as a rest stop for the form element 111 and defines the distance of the source container 110, when the latter is seated in place, from the upper part 157 and the lower part 158. To prevent the first form element 111 from slipping out of the first counterpart element 151, a spring-biased retaining latch 153 pushes the form element 111 against the bottom 152 of the slot, as is shown in FIG. 2. To remove the source container 110 from the drive device 150, the retaining latch 153 can be opened electromechanically or pneumatically. As illustrated in FIG. 1 and FIG. 2, if the nose of the retaining latch is given a suitable shape, by applying enough force in removing the source container 110 the retaining latch 135 can be pushed to the side by the form element 111. The spring-loaded retaining latch 153 and/or the bottom 152 of the slot can in addition have electrical contacts which, when the source container 110 is set in place, make contact with matching contacts on the first form element 111 or on the source container and thereby establish an electrical connection between the source container 110 and the drive device 150. This kind of an electrical connection can be used as a ground connection of the source container or also for identification purposes as will be explained below.

The second counterpart element 181 in cooperation with the second form element 121 serves to position the source container 110 not only in the plane that extends orthogonal to the load direction, but also supports the source container 110 in a defined manner in the direction of the load. The second form element 121 has a spherical zone with the center of the sphere lying on the longitudinal axis of the source container 110. The second counterpart element 181 is likewise of fork-shaped configuration. The bottom 182 of the slot has a cone-shaped flank or chamfer 183 which narrows in the direction of the load. When the source container 110 is set in place, the spherical zone 121 rests against the flank 183 and forms a ring-shaped seating contact. Depending on the configuration of the dosage-dispensing head 122 and the location where the second form element 121 is positioned on the dosage-dispensing head 122, it is possible to give up the fork-shaped design of the second counterpart element. The second counterpart element 181' can also have a cylindrical cutout or, as shown in a sectional view in FIG. 3, a cutout that narrows in the direction of the load. A third variant is illustrated schematically in FIG. 4 and shows the second counterpart element 180" which is configured with projections 184 that form a three-point support for the spherical zone of the form element 121.

The drive device 150 further has a locking device 160 which, as shown in FIG. 2, acts on the cover 113 of the source container 110 when the latter is seated in place, and secures the source container so that it cannot move against the direction of the load. The locking device, too, can in addition have an electrical connection to the source container as described above for the retaining latch 153 and be actuated mechanically, electromechanically or pneumatically. The electrical connections can be used for example as switches for the actuation of the retaining latch 153, or their signals can be used for confirmation to the controller device that there is in fact a source container in place. Furthermore, there is a cutout 114 formed on the cover. When the source container 110 is seated in place, this cutout 114 is engaged by a securing element 170 against rotary displacement, in order to receive and counteract the torque acting on the source container 110. The securing device 170 in this example of an embodiment is configured as a simple resilient tongue, so that when the source container 110 is set in place, no attention needs to be given to the position of the cutout 114 in relation to the securing element 170. As soon as the drive mechanism is coupled to the closure shaft 132 through a drive shaft 156, and a torque is acting on the closure shaft 132, the source container 110 is pulled along in the rotation until the securing element 170 snaps into the cutout 114. Of course, the source container 110 can also be turned manually into the correct position. As a securing device, one could use not only a resilient tongue but also bolts, pins, clamping claws and the like. The securing device 170, too, can have an electrical connection to the source container 110, as described above for the retaining latch 153. At the same time, the securing device 170 as illustrated acts as an overload safety device for the drive mechanism, in case the closure shaft 132 becomes blocked in the source container 110, 110'. Of course, the cutout 114 can be formed at an arbitrary location on the source container 110, and the securing device 170 can be arranged at suitably matched positions of the drive device 150.

The illustrated embodiment has the advantage that the source container 110 occupies a clearly defined position relative to the drive device 150 and is secured against further rotary displacement. This supports the automatic identification of the source container 110, as an identification marking 115 affixed to the source container 110, for example a barcode or a matrix code, is precisely positioned in relation to the identification reader device 175, represented in FIG. 1 by a camera.

As a means to capture suitable input variables for the control of the dosage-dispensing device, the drive device 150 can be connected mechanically through height-adjustable feet 159 and through an electrical connection (not shown) to a force-measuring device 190, on whose load receiver 191 the target container 200 is set up. The adjustable feet 159 allow the use of different target containers with different container heights.

FIG. 2 shows the dosage-dispensing device 100 of FIG. 1, a handling device 300 for source containers 110, 110', and a multi-unit holder rack 400. The multi-unit holder rack 400 can be incorporated in the handling device 300 or also, as shown in FIG. 2, arranged separately from the handling device 300. A source container 110 is set in place in the drive device 150 of the dosage-dispensing device 100. The drive shaft 156 is coupled to the closure shaft 132. For the coupling, the drive shaft 156 has to be movable in the direction of the load, and for the uncoupling against the direction of the load.

Instead of the identification marking 115 shown in FIG. 1, the source container 110 includes an identification emitter 116, for example an RFID tag or a communication- and memory chip. Accordingly, the identification-reader device 175 is not a camera, but a receiver that communicates with the identification emitter 116.

The schematically illustrated handling device 300 has a handling arm 301 capable of swiveling in a plane that is orthogonal to the direction of the load. In addition, the handling arm 301 is capable of linear movement in and against the direction of the load. The fork-shaped seat 302 of the handling arm 301 can be advanced and retracted in the direction of the longitudinal axis of the handling arm 301. By means of this handling arms 301 and its receiver seat 302 which grips the cover 113, the source container 110, 110' can be set into and removed from the drive device 150. Of course, it is also possible to use industrial robots which are employed in many applications or so-called carousel conveyors instead of the illustrated handling device 300.

The multi-unit holder rack which is set up adjacent to the handling device serves to store the source containers 110' that are not used at the moment. Due to their rotationally symmetric configuration which is illustrated in FIG. 1 and FIG. 2, the source containers 110, 110' are position-independent relative to their symmetry axis also when they are sitting in the rack.

Figure 3:
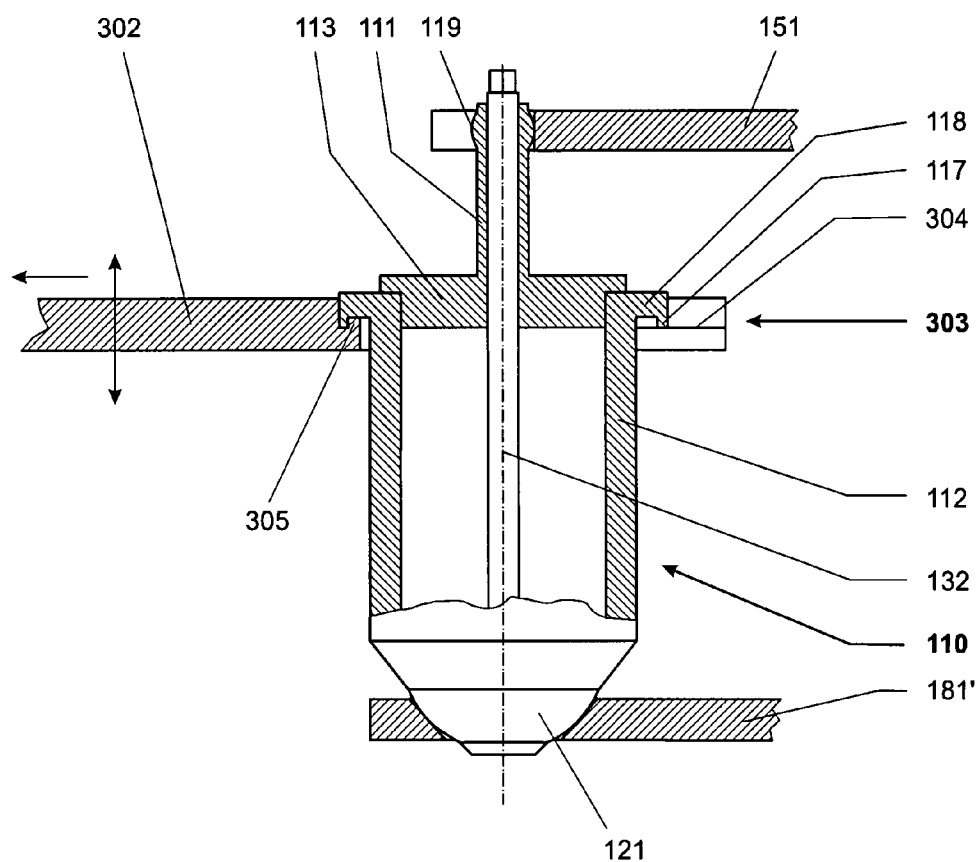
FIG. 3 shows the source container in a partially sectional view as well as part of the first counterpart element and of the second counterpart element, and of the fork-shaped seat of the handling device, in a sectional view.
Figure 4:
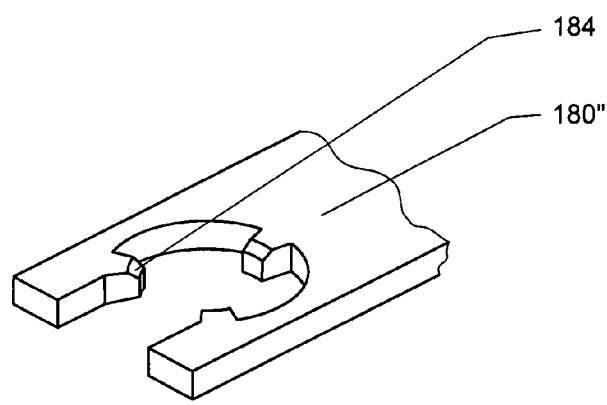
FIG. 4 shows a further configuration of a second counterpart element.

FIG. 3 shows in a partially sectional view the source container 110 seated in the drive device. Of the drive device, only a part of the first counterpart element 151 and a part of the previously described second counterpart element 181' are shown in sectional view, and of the handling device only the fork-shaped seat 302. On the tube-shaped middle part 112 or the cover 113, a flange 118 is formed around the circumference, which has on its underside, i.e. facing in the direction of the load, a first projection 117 running concentric to the closure shaft 132. In the slot 303 of the fork-shaped seat 302 a stepped-off rest surface 304 is formed, which in the area of the bottom of the slot has a second projection 305 pointing against the direction of the load. This second projection 305, whose configuration can also be clearly seen in FIG. 2, reaches up behind the first projection 117 of the source container held by the handling device. This prevents the source container 110 from falling out of the fork-shaped seat 302 during the handling operation. In addition, when removing the source container 110 from the drive device, at least the force of the retaining latch has to be overcome. The first form element 111 in FIG. 3 is of a substantially cylindrical shape and has a spherical zone 119 at the opposite end from the cover 113. So that the source container 110 can be lifted out of the second counterpart element 181' against the direction of the load and then pulled out of the drive device at a right angle to the direction of the load, the first form element 111 has to be rod-shaped in accordance with the required upward travel and movable in the first counterpart element 151 against the direction of the load as well as in the direction of the slot of the first counterpart element 151. With the configuration according to the foregoing description, the source container 110 is held in a defined position in the area of the first counterpart element 151 and the spherical zone 119 as well as in the area of the second form element 121 and the second counterpart element 181'. It is therefore impossible for the source container to become jammed up in the drive device because of misalignment.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

| List of Reference Symbols | |
|---|---|
| 100 | dosage-dispensing device |
| 110', 110 | source container |
| 111 | first form element |
| 112 | tube-shaped middle part |
| 113 | cover |
| 114 | cutout |
| 115 | identification marking |

-continued

| | List of Reference Symbols |
|---|---|
| 116 | identification emitter |
| 117 | first projection |
| 118 | flange |
| 119 | spherical zone |
| 200 | target container |
| 121 | second form element |
| 122 | dosage-dispensing head |
| 130 | passage area |
| 131 | coupler part |
| 132 | closure shaft |
| 150 | drive device |
| 151 | first counterpart element |
| 152 | bottom of slot |
| 153 | retaining latch |
| 154 | coupling sleeve |
| 155 | drive mechanism |
| 156 | drive shaft |
| 157 | top part |
| 158 | bottom part |
| 159 | foot |
| 160 | locking device |
| 170 | securing device against rotary displacement |
| 175 | identification reader device |
| 180'', 181', 181 | second counterpart element |
| 182 | bottom of slot |
| 183 | flank |
| 184 | projection |
| 190 | force-measuring device |
| 191 | load receiver |
| 300 | handling device |
| 301 | handling arm |
| 302 | fork-shaped seat |
| 303 | slot |
| 304 | rest surface |
| 305 | second projection |
| 400 | multi-unit holder rack |

What is claimed is:

1. A dosage-dispensing device for substances in powder- or paste form, comprising a drive device and a source container that can be set into the drive device, wherein a dosage-dispensing head is connected to a closure shaft which is movably constrained in the source container is arranged at the underside of the source container when the latter is in its operating position, wherein the closure shaft has a coupler part in a passage area where it passes through the topside of the source container, said coupler part being configured to be coupled to and uncoupled from a drive shaft of the drive device, wherein the source container has a first form element which is designed for form-fitting engagement with a first counterpart element formed on the drive device and serves to precisely position the coupler part in relation to the drive shaft in a plane that is orthogonal to the axis of rotation of the drive shaft, and wherein the source container further has a second form element which is designed for form-fitting engagement with a second counterpart element formed on the drive device and which, when in operating position, serves to precisely position the dosage-dispensing head in relation to a target container which is arranged below the dosage-dispensing head.

2. A dosage-dispensing device according to claim 1, wherein the distance of the first counterpart element from the second counterpart element is adjustable and capable of being adapted to the distance of the first form element from the second form element.

3. A dosage-dispensing device according to claim 1, wherein the distance between the second counterpart element and a fill opening of the target container, or if the source container is set in place in the drive device, the distance between the dosage-dispensing head and a fill opening of the target container, is adjustable.

4. A dosage-dispensing device according to claim 1, wherein a force-measuring device, in particular a balance, is electrically and/or mechanically connected to the drive device.

5. A dosage-dispensing dispensing device according to claim 1, wherein the source container comprises a tube-shaped middle part with a bottom end where the dosage-dispensing head is releasably or monolithically connected and a top end where a cover is releasably or monolithically connected, wherein the passage area as well as the first form element are formed on the cover and the second form element is formed on the dosage-dispensing head.

6. A dosage-dispensing device according to claim 5, wherein the tube-shaped middle part has an arbitrarily selectable cross-sectional profile in a plane that is orthogonal to the rotary axis of the closure shaft.

7. A dosage-dispensing device according to claim 1, wherein the volume of source containers whose cross-section is the same over the entire length is determined by the length of the tube-shaped middle part.

8. A dosage-dispensing device according to claim 1, wherein the first form element has a tube-shaped configuration and radially surrounds the passage area, wherein the outside surface of the form element is of cylindrical or barrel-shaped configuration, wherein on the form element at least the contact locations that touch the first counter part element are arranged on a circle in the plane that extends orthogonal to the rotary axis of the closure shaft and the center of said circle lies on said rotary axis of the closure shaft.

9. A dosage-dispensing device according to claim 1, wherein the first counterpart element comprises a forked part whose slot width matches the width of the first form element and wherein a position-defining rest stop for the first form element is formed at the bottom of the slot.

10. A dosage-dispensing device according to claim 1, wherein at least one retaining latch acting on the first form element or on the source container is arranged on the first counterpart element or on the drive device.

11. A dosage-dispensing device according to claim 1, wherein at least one spherical zone is formed on the second form element, whose center of the sphere is located on the rotary axis of the closure shaft, and wherein the second counterpart element has a breakthrough or cutout with a narrowing taper in the direction of the load, wherein at least three contact points or contact areas are formed in said breakthrough, which are in contact with the aforementioned spherical zone when the source container is seated in place, whereby the source container can be defined in its spatial position relative to the drive device and to the target container.

12. A dosage-dispensing device according to claim 1, wherein the first form element and the second form element and/or the source container are configured substantially with rotational symmetry relative to the rotary axis of the closure shaft.

13. A dosage-dispensing device according to claim 1, wherein the source container, after it is set into the drive device, is freely rotatable relative to the rotary axis of the closure shaft.

14. A dosage-dispensing device according to claim 1, wherein a securing device against rotary displacement with at least one defined detent position is arranged between the drive device and the source container.

15. A dosage-dispensing device according to claim 14, wherein the securing device comprises a spring element serving to protect the drive mechanism from overload.

16. A dosage-dispensing device according to claim 1, wherein the source container has an identification marking or an identification emitter.

17. A dosage-dispensing device according to claim 16, wherein at least one detent position of the securing device is arranged so that the position of the identification marking or the identification emitter is aligned with the position of an identification reader device which occupies a location that is separate from the source container.

18. A dosage-dispensing device according to claim 1, wherein the drive device comprises a locking device which serves to secure the source container seated in the dosage-dispensing device against axial displacement relative to the closure shaft.

19. A dosage-dispensing device according to claim 1, wherein the source container comprises at least one flange extending along at least part of the circumference in a plane that is orthogonal to the rotary axis of the closure shaft, wherein at least one first projection facing in the direction of the load is formed in the border area of the flange.

20. A dosage-dispensing device according to claim 19, wherein the at least one flange and the at least one projection are of a shape that is concentric with the closure shaft.

21. A dosage-dispensing device according to claim 19, wherein there is a handling device which comprises at least one receiving seat which is configured to provide a form-fitting engagement with the flange and the first projection, and wherein at least one rest surface and at least one recess and/or a second projection are formed on the receiving seat.

22. A dosage-dispensing device according to claim 21, wherein the handling device comprises at least one multi-unit rack serving for the storage of a plurality of source containers.

23. A dosage-dispensing device according to claim 22, wherein the handling device is connected to the drive device through a communication means and wherein at least one memory unit serving to store specific data of the source containers held in the multi-unit rack is arranged in the handling device and/or in the drive device.

\* \* \* \* \*